W. C. BARBER & G. AMIS.
Bean-Harvester.

No. 162,139.  Patented April 20, 1875.

Witnesses.
Mary J. Utley.
James M. West.

Inventors:
William C. Barber
George Amis
By
Warren C. Stone, Attorney.

THE GRAPHIC CO.PHOTO-LITH.39 & 41 PARK PLACE, N.Y.

UNITED STATES PATENT OFFICE.

WILLIAM C. BARBER AND GEORGE AMIS, OF KNOWLESVILLE, NEW YORK.

IMPROVEMENT IN BEAN-HARVESTERS.

Specification forming part of Letters Patent No. 162,139, dated April 20, 1875; application filed October 8, 1874.

*To all whom it may concern:*

Be it known that we, WILLIAM C. BARBER and GEORGE AMIS, of Knowlesville, Orleans county, New York, have jointly invented a Combination Bean-Harvester, of which the following is a specification:

Our invention relates to an improvement in bean-harvesters, whereby two rows of beans may be cut at the same time, while steadiness to preserve the course of the machine is obtained when the cutters run very near the surface of the ground, and above the fibers of the roots.

Figure 1:
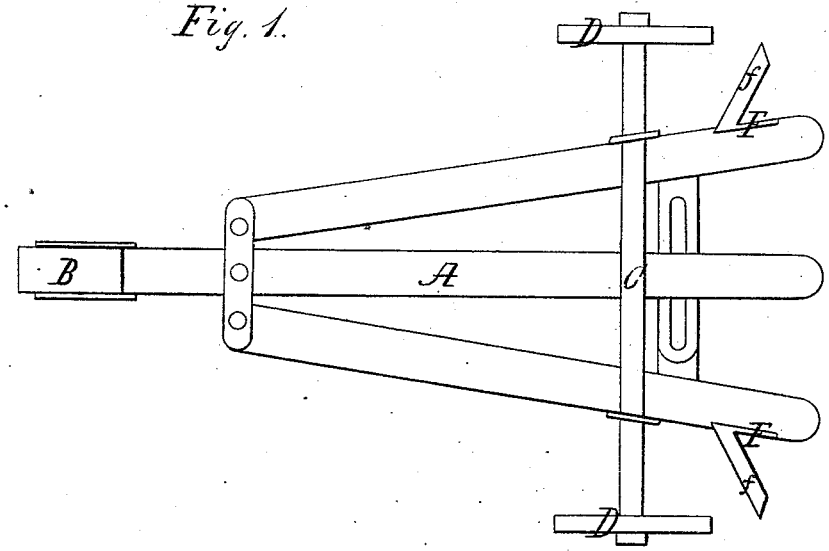
Figure 2:
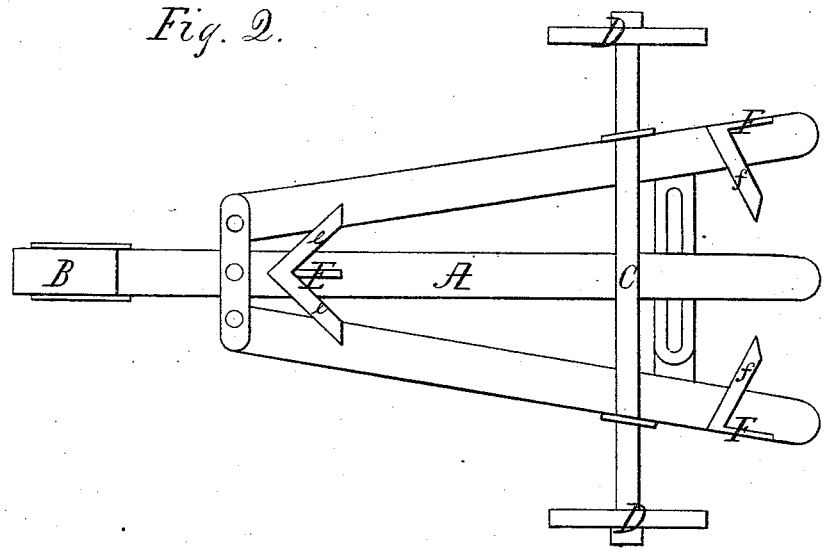

Referring to the drawings, Figure 1 is an inverted plan of our machine, as adapted for a bean-harvester, and Fig. 2 is an inverted plan of the same, as arranged for a cultivator.

Like letters refer to the same parts throughout the drawings.

A represents an ordinary cultivator-frame, provided with the usual front guide-wheel B. This frame may be adjusted to any desired width in the usual manner. C represents an axle, attached either above or below the frame, at or near the rear end thereof, upon which is arranged the small wheels D D. E represents the front tooth or cutter made with double cutting-edges *e e*, as shown. F F represent the rear cutters made, as shown, each with a single angular knife or cutter, *f*. These cutters are made thin and with sharp cutting-edges, adapted to be ground, as required. The object of the rear guide-wheels is to gage the cutters at a uniform depth, which, for the purpose of a bean-stalk cutter, should be very near the surface of the ground. They, the wheels, therefore also serve to maintain the machine in a direct line, and prevent its being swayed from side to side, as the knives on either side come alternately in contact with the roots of the plants.

In the cultivation of small or young plants it is frequently desirable to cut the weeds without disturbing the roots of the plants, and to avoid throwing the dirt on or over the the same plants. This is especially desirable in the cultivation of beans. It will be observed that this end is very readily attained by means of the thin cutting double knife or tooth E, and the rear knives or teeth F F, under the arrangement shown in Fig. 2, in which the cutting portion of the rear knives is turned inward.

It is obvious that the rear wheels and axle may be detachably connected with the frame, and that ordinary cultivator-teeth may be inserted in lieu of the cutters described, and the whole used as an ordinary cultivator.

Having thus fully described our invention, what we claim, and desire to secure by Letters Patent, is—

The combination, substantially as herein shown and described, of the frame A, single front guide-wheel B, cutters F F, and a pair of rear guide-wheels, D D, as and for the purpose set forth.

WILLIAM C. BARBER.
GEORGE AMIS.

Witnesses:
W. R. BUNNY,
ALBERT S. WARNER.